United States Patent
Raja et al.

(10) Patent No.: US 12,424,846 B2
(45) Date of Patent: Sep. 23, 2025

(54) ON DIE CURRENT SINK CIRCUIT FOR OVERSHOOT MITIGATION

(71) Applicant: NVIDIA Corp., Santa Clara, CA (US)

(72) Inventors: Tezaswi Raja, San Jose, CA (US); Abhishek B Akkur, San Jose, CA (US); Jun Gu, San Jose, CA (US); Chengcheng Liu, Sunnyvale, CA (US)

(73) Assignee: NVIDIA Corp., Santa Clara, CA (US)

( * ) Notice: Subject to any disclaimer, the term of this patent is extended or adjusted under 35 U.S.C. 154(b) by 449 days.

(21) Appl. No.: 18/186,389

(22) Filed: Mar. 20, 2023

(65) Prior Publication Data
US 2024/0322559 A1    Sep. 26, 2024

(51) Int. Cl.
*H02H 9/04* (2006.01)

(52) U.S. Cl.
CPC .................. *H02H 9/045* (2013.01)

(58) Field of Classification Search
CPC ............... H02H 9/005; H02H 9/045
USPC ............................................... 361/56
See application file for complete search history.

(56) References Cited

U.S. PATENT DOCUMENTS

| | | | | |
|---|---|---|---|---|
| 6,462,607 B1 * | 10/2002 | Nakagawa | ............... | H03K 4/00 327/519 |
| 7,834,428 B2 * | 11/2010 | Secareanu | ............... | H10D 84/85 257/296 |
| 8,791,679 B2 * | 7/2014 | Gagne | ............... | H02H 9/046 323/283 |
| 2020/0028355 A1 * | 1/2020 | Chen | ............... | H02H 9/046 |

\* cited by examiner

*Primary Examiner* — Kevin J Comber
(74) *Attorney, Agent, or Firm* — Carnelian Law, LLC

(57) ABSTRACT

An integrated circuit that includes multiple power rails with dummy loads configured on at least some of the power rails. The dummy loads are activated in response to a voltage overshoot condition on regions of the power rails at which the dummy loads are located. The dummy loads may be substituted for decoupling capacitors or other active cells at particular regions of the power rails.

20 Claims, 4 Drawing Sheets

ON DIE CURRENT SINK CIRCUIT FOR OVERSHOOT MITIGATION

BACKGROUND

In some situations a voltage overshoot may occur on power rails in integrated circuits when a load on the rail is released. For example, when the workload on a data processor (e.g., a general purpose central processing unit or a graphics processing unit) stops or diminishes suddenly, there may be an insufficient path for discharging the circuit board inductors associated with powering the component, resulting in voltage overshoot on one or more power rails supplying the processor. FIG. 1 depicts an example of voltage overshoot.

Voltage overshoot may introduce operational problems into a circuit related to timing closure and hold risk. For example, the overshoot voltage may exceed a voltage at which the circuit is tested for timing closure. The overshoot may also cause functional (hold) failures, especially at higher voltages. The overshoot generally may decrease circuit reliability and in severe cases may cause oxide breakdown, premature aging, and excess electron migration.

In a conventional integrated circuit, power regulation may be designed to counteract the effects of a sudden load current decrease, but the response time may be insufficient to prevent overvoltage conditions across the entire circuit. In some cases, the regulator response may take on the order of hundreds of microseconds, enabling higher-than-intended voltage levels to persist on the circuit's voltage rails throughout a large number of clock cycles, potentially impacting circuit performance and potentially damaging or degrading the circuit materials.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are mechanisms to detect a sudden decrease in load current and in response to activate a dummy load to enable additional current flow from the supply rails. This results in a lower net effective change in load current, reducing voltage overshoot effects.

Figure 1:
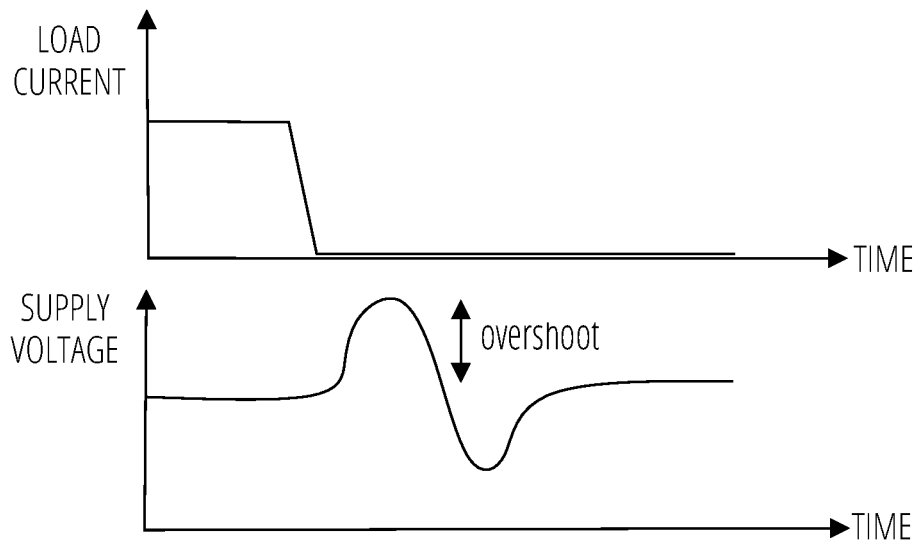
FIG. 1 depicts an example of voltage overshoot.
Figure 2:
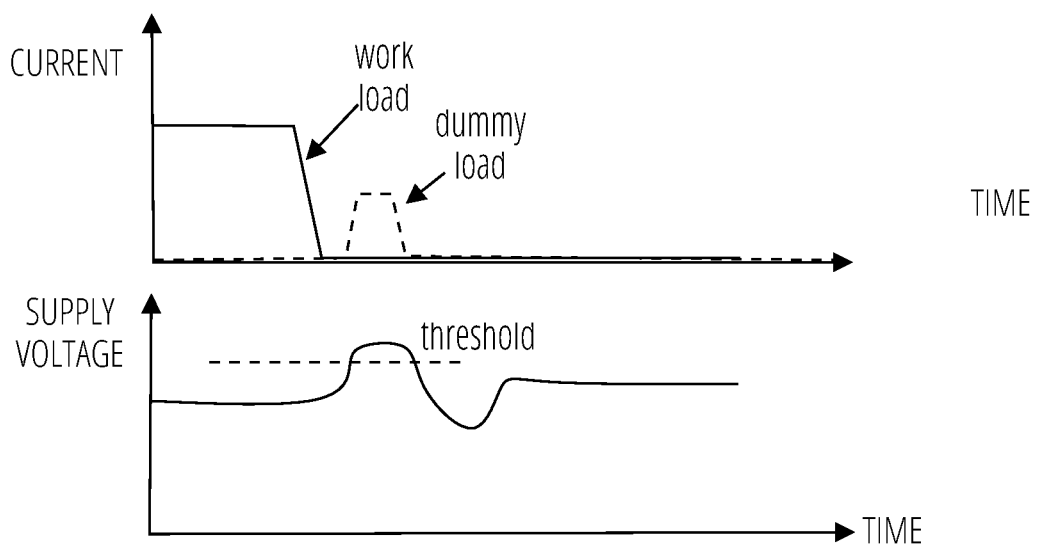
FIG. 2 depicts exemplary effects of the utilization of a dummy load circuit to mitigate voltage overshoot.

FIG. 2 depicts an example of the utilization of a dummy load (circuit with a sole or primary function to consume/sink current) to mitigate voltage overshoot. The amplitude of the overshoot (and to some extent of the undershoot) in the supply voltage due to a sudden decrease in load are both reduced.

In one aspect, voltage changes in a circuit (e.g., a chip) are monitored using an analog to digital converter (ADC). Dummy loads are enabled in response to the monitored voltage crossing a configured threshold level (e.g., 100 mv), thereby generating an additional load current that limits voltage overshoot effects.

In one embodiment, overshoot mitigation mechanisms are distributed across an integrated circuit chip, configured between the operational power rails and ground rails in strategic locations on the chip in order to sink excess current locally (near the actual load circuits) when load current utilization decreases suddenly (in a time interval shorter than the power supply's ability to regulate its output voltage).

In another embodiment, the overshoot mitigation mechanisms are configured between an auxiliary power supply and the operational power rails, providing localized rapid response and mitigation.

The mechanisms may be utilized in a quantity and distribution pattern tailored to expected current load-based voltage effects of a particular integrated circuit design. Considerations include an amount of current each circuit may be able to sink based on its design constraints in conjunction with an amount of excess current expected during a sudden load decrease for a particular chip design or intended applications (e.g., encryption). Another potential consideration is an amount of voltage overvoltage that components of the chip can tolerate.

In one implementation, the overshoot mitigation mechanisms are evenly distributed across the physical dimensions of the chip so as to provide a balanced response throughout the circuit structure. For example, it may be determined that a chip that is four square centimeters in area should have one hundred of these circuits located at approximately equal intervals or grid points on the die. Each square centimeter of the chip may for example have twenty-five such mitigation circuits, and no two instances of the circuit may be placed less than two millimeters away from each other.

In another implementation, the overshoot mitigation circuits may be located at bespoke distances from sensitive components to prevent secondary effects that may disrupt the operation of those components.

In one operational mode, i.e., the mitigation mechanisms are fully engaged throughout the entirety of an overvoltage event. In another mode, the mitigation mechanisms are operated in a duty cycle mode, i.e., cycled into and out of engagement, such that the mitigation is operative for only a percentage of the duration of the overvoltage event. For example, the circuit may be configured to engage half of the time by being driven by a waveform having a 50% duty cycle. This mode may provide overvoltage protection while preventing undue wear on the sink circuit due to constant operation.

The duty cycle of certain sink circuit configurations may be tuned to prevent ringing or resonant interference in a range for which a nearby functional circuit is particularly sensitive. The clocking of this configuration signal may be provided by the integrated circuit's core clock signal, or any other clock signal available in the circuit that is appropriate to the constraints of the design.

In one embodiment, a circuit manufacturing process selectively substitutes overshoot mitigation circuits for some decoupling capacitor cells (e.g., DCAP64 cells) or other active load cells in an integrated circuit. The substitutions may be made at power rail regions where decoupling capacitor cells or other active loading circuits would conventionally be utilized, where overshoot mitigation is especially important (such as near to complex and sensitive processing cores of a graphics processing unit or central processing unit). A dummy loading circuit may be understood to be a "passive loading circuit", a sub-circuit of the integrated circuit with a primary and possibly sole purpose of acting as a load on a power supply rail. An "active loading circuit" in contrast is a sub-circuit of the integrated circuit with a primary or sole purpose of providing an operational effect in the integrated circuit above and beyond merely acting as a load on a power supply rail. Decoupling capacitor cells are active loading circuits well-known and understood in the art of integrated circuit design and manufacture.

Figure 3:
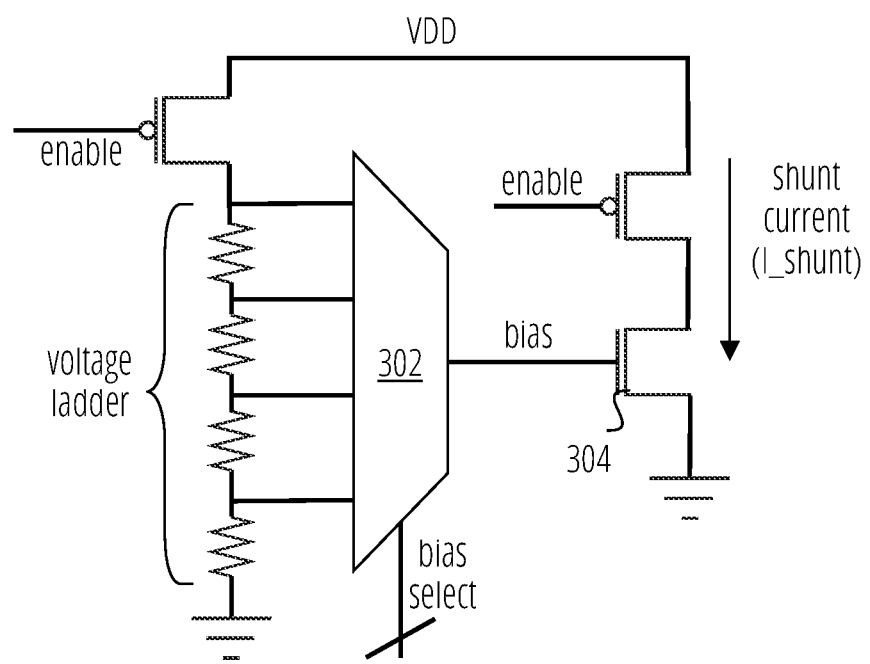
FIG. 3 depicts an embodiment of a power rail voltage overshoot mitigation circuit.

FIG. 3 depicts an embodiment of a power rail voltage overshoot mitigation circuit. Multiple instances of the circuit may be disposed at locations throughout in an integrated circuit (e.g., a chip) to facilitate more uniform responses to changes in load current.

The circuit utilizes a configurable and selectable bias signal to control an amount of sink current between a power rail (VDD) and a ground plane or rail. For example, with appropriate settings of the resistors on the voltage ladder, one instance of this circuit may sink a configurable amount of between 1 mA-3.5 mA of current depending on the bias select. The cell has $2^n$ configurations (possible values of the bias signal selected from the voltage ladder by the selector 302) where n is the bit width of the bias select signal.

The various bias voltages that may be selected (e.g., where n=2) may be configured by way of the voltage ladder resistor values to achieve 25%, 50%, 75% and 100% of the potential channel current throughput of the transistor 304.

Because the circuit utilized entirely asynchronous components, no clock or frontend (like clock gating) need to utilized (i.e., "enable" can be always ON or OFF). However, some embodiments may utilize a variable enable signal, e.g., a clock signal of a given duty cycle, to create a time-averaged dummy load effect during an overshoot event. This may extend the operational lifetime of the circuit by mitigating wear due to current surge effects.

The dummy load circuits distributed throughout an integrated circuit may be operated with pulsed (e.g., square wave) enable signals with a duty cycle that is independently configured for the requirements/constraints of overshoot protection for components on particular regions of the integrated circuit's power rails. The amounts of the dummy loads generated at particular regions of the power rails are quantized by the voltage ladder. This quantization may be based on transistor threshold voltage level increments as will be described more fully in conjunction with FIG. 4.

In addition to application to voltage overshoot mitigation, this circuit may be utilized in testing/profiling modes of the larger circuit to generate localized IR drops of configurable scale.

Figure 4:
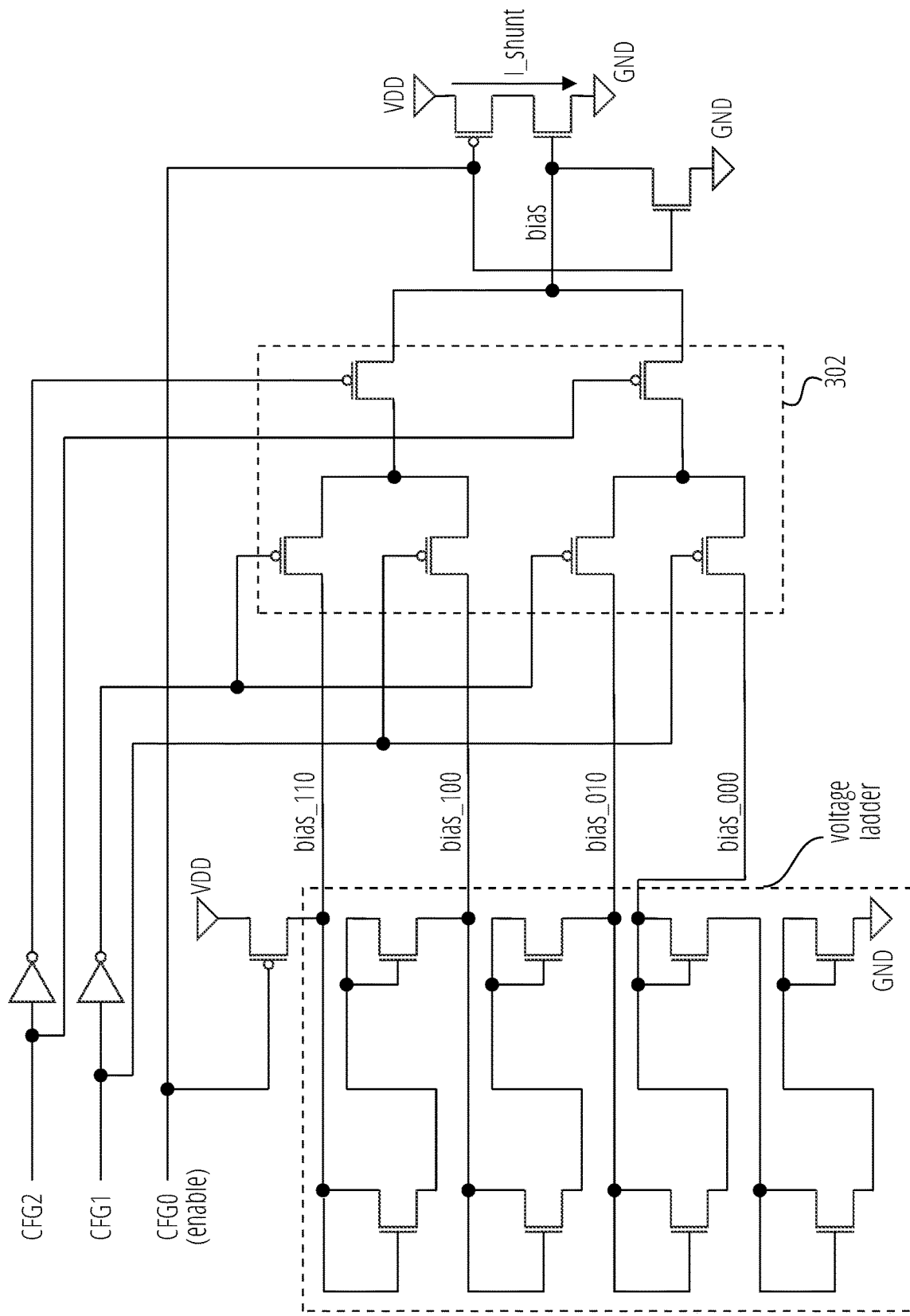
FIG. 4 is a transistor-level depiction of an embodiment of a voltage overshoot mitigation circuit.

FIG. 4 is a transistor-level depiction of an embodiment of a voltage overshoot mitigation circuit. The circuit generates a configurable bias(bias_000 . . . bias_110) to a current shunt between a supply rail and ground. The bias generates a shunt current (effectively, a dummy load) in an amount determined by a three-bit code (CFG<2:0>). Bit CFG[0] also acts as the enable signal (see FIG. 3). The resistive elements of the voltage ladder are implemented using NMOS pairs, so that the NMOS threshold voltage drops across the NMOS devices effectively determine the bias voltage options for selection.

The overshoot mitigation circuit may operate as a dummy load coupled to a power rail. The digital code (CFG in this example) may be applied to the dummy load over a bus in response to a voltage overshoot event on the power rail. The digital code configures the dummy load to one of a plurality of discrete values derived from the threshold voltages of the NMOS devices that implement the voltage ladder. One bit of the digital code (CFG[0] in this example) may act as an enable signal for the dummy load. The enable signal may, in some embodiments, be pulsed (possibly with a non-50% duty cycle) during the voltage overshoot event.

Figure 5:
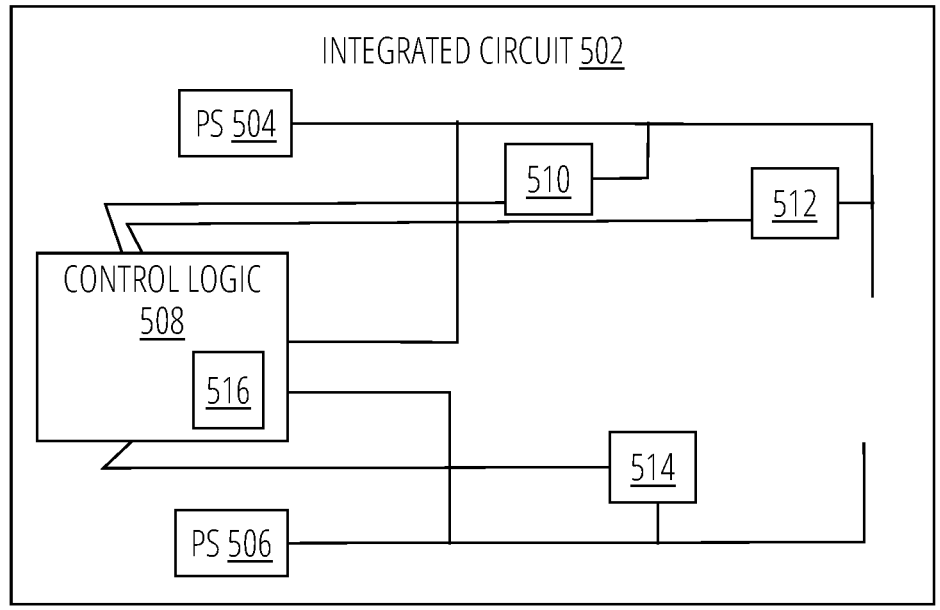
FIG. 5 depicts an integrated circuit 502 in one embodiment.

FIG. 5 depicts an integrated circuit 502 in one embodiment. Two power domains are depicted supplied by different power supplies 504, 506. Control logic 508 monitors power rails of each of these power domains to detect voltage overshoot (voltage exceeding a configured threshold level). The control logic 508 responds to detected voltage overshoot conditions by enabling one or more overshoot mitigation circuit 510, overshoot mitigation circuit 512, overshoot mitigation circuit 514 to generate dummy loads on one or more of the supply rails. The amount of dummy loading generated by each of the mitigation circuits is individually configurable via configuration codes applied to the mitigation circuits. The mitigation circuits may be enabled for a time interval that may be individually configurable as well (e.g., utilizing one bit of the applied code). In some cases the mitigation circuits may be enabled until such time as the overshoot is detected by the control logic 508 to be sufficiently mitigated, e.g., the voltage on the supply rail falls below a threshold or to within an acceptable range. As noted previously, the enable signal may be pulsed/time averaged by a waveform generator 516 (e.g., a 50% duty cycle square wave generator) to prevent or mitigate component damage from extended surges of shunt current.

Figure 6:
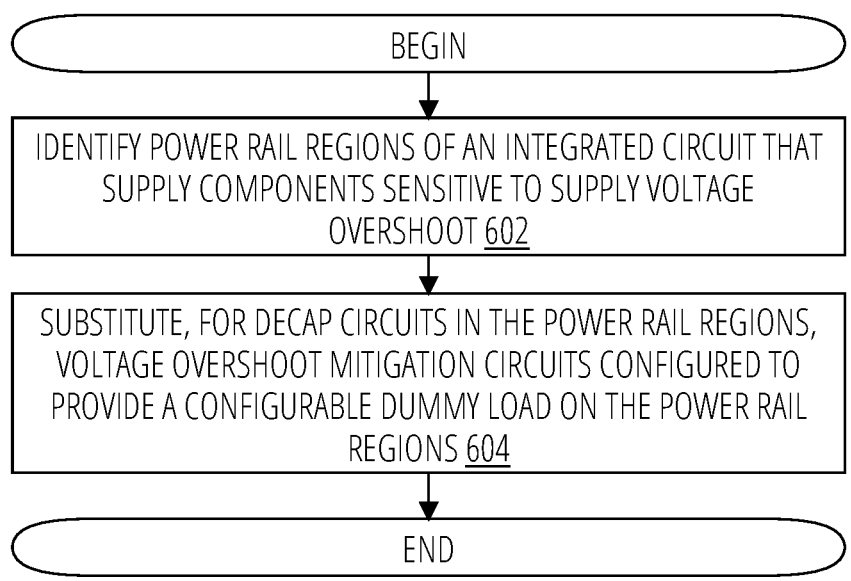
FIG. 6 depicts a manufacturing process in accordance with one embodiment.

FIG. 6 depicts an integrated circuit manufacturing process in one embodiment. Power rail regions of an integrated circuit that supply components sensitive to supply voltage overshoot are identified (action 602) and voltage overshoot mitigation circuits are substituted for decoupling capacitor or other loading circuits in the power rail regions (action 604). The voltage overshoot mitigation circuits are configured to provide a configurable dummy load on the power rail regions.

LISTING OF DRAWING ELEMENTS 302 selector
304 transistor
502 integrated circuit
504 power supply
506 power supply
508 control logic
510 overshoot mitigation circuit
512 overshoot mitigation circuit
514 overshoot mitigation circuit
516 waveform generator
602 action
604 action Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device.

Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
identifying power rail regions of an integrated circuit that supply components sensitive to supply voltage overshoot; and
substituting dummy load circuits for active loading circuits in the power rail regions,
wherein the amount of dummy load is digitally configurable.

2. The method of claim 1, wherein the active loading circuits comprise decoupling capacitor circuits.

3. The method of claim 1, wherein the dummy load circuits are configured to be individually enabled and disabled.

4. The method of claim 3, wherein the dummy load circuits are configured to be individually enabled by way of a pulsed signal.

5. The method of claim 1, further comprising:
detecting voltage levels on the power rail regions; and
enabling the dummy load circuits on one or more of the power rail regions where the detected voltage levels exceed a configured threshold value.

6. The method of claim 5, wherein the threshold value is configured to different value for different ones of the power rail regions.

7. A circuit comprising:
a plurality of power rails;
a plurality of dummy loads configured on the power rails; and logic to activate the dummy loads in response to a voltage overshoot condition on the power rails,
wherein an amount of the dummy loads is configurable using binary codes.

8. The circuit of claim 7, wherein an amount of each of the dummy loads is independently configurable.

9. The circuit of claim 7, wherein each of the dummy loads is configured to be independently enabled from the others.

10. The circuit of claim 7, wherein at least some of the dummy loads are disposed at locations on the power rails such that they substitute for active loading circuits at the locations.

11. The circuit of claim 10, wherein the active loading circuits are decoupling capacitor circuits.

12. The circuit of claim 7, wherein the logic to activate the dummy loads is configured to generate a pulsed enable signal to one or more of the dummy loads.

13. The circuit of claim 12, wherein the pulsed enable signal comprises a variable duty cycle.

14. The circuit of claim 7, configured such that amounts of the dummy loads are quantized based on transistor threshold voltage level increments.

15. The circuit of claim 14, each of the dummy loads configurable when enabled to generate one of four dummy load values.

16. The circuit of claim 14, each dummy load comprising a voltage ladder and a selector to generate the quantized amounts of dummy load.

17. A circuit comprising:
a dummy load coupled to a power rail;
a bus; and
logic to generate a digital code on the bus in response to a voltage overshoot event on the power rail to configure the dummy load to one of a plurality of discrete values.

18. The circuit of claim 17, wherein the plurality of discrete values are derived from NMOS threshold voltages.

19. The circuit of claim 17, wherein one bit of the digital code is an enable signal for the dummy load.

20. The circuit of claim 19, wherein the enable signal is pulsed during the voltage overshoot event.

\* \* \* \* \*